United States Patent [19]

Jennings

[11] Patent Number: 5,020,578
[45] Date of Patent: Jun. 4, 1991

[54] WOODWORKING APPARATUS

[76] Inventor: Ralph L. Jennings, 205 Williams Ave., North Platte, Nebr. 68101

[21] Appl. No.: 601,193

[22] Filed: Oct. 22, 1990

[51] Int. Cl.$^5$ .......................... B26D 7/06; B27C 5/00
[52] U.S. Cl. .................... 144/145 R; 83/413; 83/409; 83/425; 83/437; 83/435.1; 144/2 R; 144/137; 144/138; 144/143; 144/198 A; 144/136 H; 269/58; 269/304
[58] Field of Search ............. 144/2 R, 136 R, 136 G, 144/136 H, 137, 138, 143, 145 R, 148 A; 269/304, 56, 57, 58; 83/435.1, 409, 425, 437, 413

[56] References Cited

U.S. PATENT DOCUMENTS

| | | | |
|---|---|---|---|
| 259,551 | 6/1882 | Kester | 144/136 H |
| 1,787,195 | 10/1929 | Gopold | |
| 2,918,953 | 12/1959 | Wraight | 144/134 R |
| 4,164,882 | 8/1979 | Mericle | 83/409 |
| 4,275,777 | 6/1981 | Briggs | 144/138 |
| 4,732,182 | 3/1988 | Gorsha | 144/198 A |
| 4,899,795 | 2/1990 | Hackett | 144/2 R |
| 4,915,149 | 4/1990 | Herenyi et al. | 144/84 |

Primary Examiner—W. Donald Bray
Attorney, Agent, or Firm—Zarley, McKee, Thomte, Voorhees & Sease

[57] ABSTRACT

A woodworking apparatus includes a conventional table saw having a table and a projecting circular saw blade. A stock moving apparatus is associated with the saw table to move a piece of stock material into engagement with the saw blade. The stock moving apparatus includes a pair of longitudinal support members with a forward and rearward plate extending therebetween. The stock material is removably and selectively rotatably mounted between the forward and rearward plates. A guide is provided on the saw table to guide the stock moving apparatus in a straight line across the saw table. A pattern apparatus is provided to impart a particular shape in the stock material when the stock material is passed over the saw blade. The pattern apparatus includes a pair of spaced apart profile boards upon which the stock moving apparatus is supported during its passage over the saw table. The particular profile of the profile boards will be imparted in the stock material as the stock moving apparatus is moved along the profile boards.

4 Claims, 7 Drawing Sheets

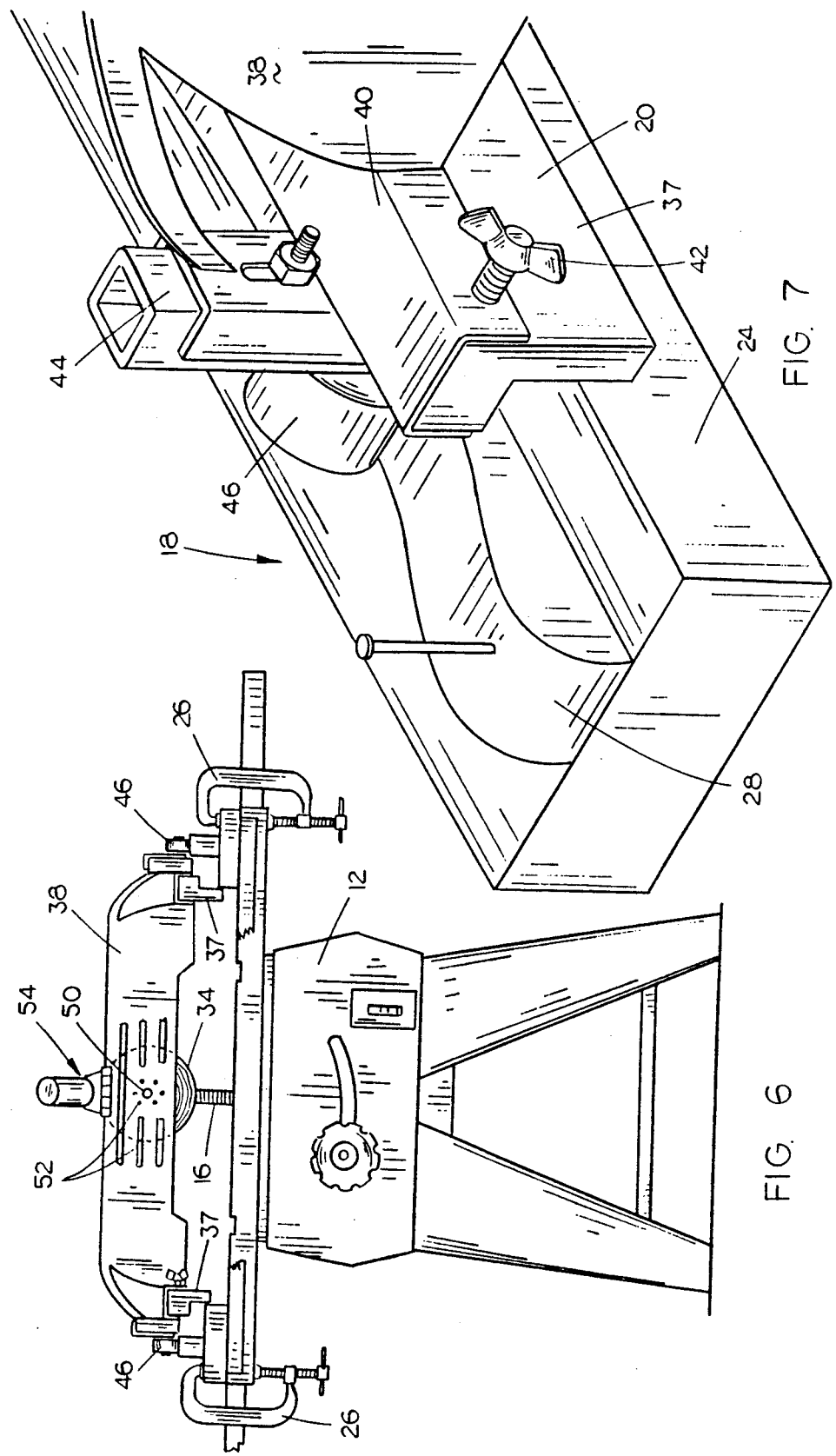

WOODWORKING APPARATUS

TECHNICAL FIELD

The present invention relates generally to woodworking apparatus, and more particularly to an attachment for table saws to permit the fashioning of cylindrical and rectangular shapes.

BACKGROUND OF THE INVENTION

Conventionally, a lathe is utilized to impart a cylindrical surface on a piece of wood or the like. This process requires the stock material to be mounted between a pair of rotating plates so as to rotate the stock. A cutting blade is then drawn along the rotating stock to form a cylindrical shape of the desired diameter.

One of the difficulties encountered is in producing a cylindrical object having a specific diameter. The cutting tool must be drawn along the rotating stock at exactly the same distance from the center of the stock for the length of the stock material, in order to produce a cylindrical dowel having a constant diameter. Similarly, to produce a shape which has a varying diameter, such as the shape of a baseball bat, it is necessary to interrupt the cutting operation to stop the rotation of the stock so as to measure the various diameters of the working material with a pair of calibers for comparison with the desired dimensions.

Lathes are specialized pieces of equipment, and may typically be only used for this particular woodworking procedure. Thus, only the woodworker who constantly creates cylindrical objects would be in the position to purchase and economically utilize a lathe.

It is therefore a general object of the present invention to provide an improved woodworking device which attaches to a conventional table saw to permit the fashioning of cylindrical and rectangular objects from raw stock material.

Another object is to provide a woodworking device which permits the production of cylindrical objects without the need for rotating the stock.

A further object of the present invention is to provide a woodworking device which permits the quick and simple fashioning of a particular cylindrical pattern without the need for continuous measurement during the cutting operations.

A further object of the present invention is to provide a woodworking device which is simple in operation and economical to manufacture.

These and other objects of the present invention will be apparent to those skilled in the art.

SUMMARY OF THE INVENTION

The woodworking apparatus of the present invention includes a conventional table saw having a table and a projecting circular saw blade. A stock moving apparatus is associated with the saw table to move a piece of stock material into engagement with the saw blade. The stock moving apparatus includes a pair of longitudinal support members with a forward and rearward plate extending therebetween. The stock material is removably and selectively rotatably mounted between the forward and rearward plates. A guide is provided on the saw table to guide the stock moving apparatus in a straight line across the saw table. A pattern apparatus is provided to impart a particular shape in the stock material when the stock material is passed over the saw blade. The pattern apparatus includes a pair of spaced apart profile boards upon which the stock moving apparatus is supported during its passage over the saw table. The particular profile of the profile boards will be imparted in the stock material as the stock moving apparatus is moved along the profile boards.

BRIEF DESCRIPTION OF THE DRAWINGS

FIG. 6 is a front elevational view taken from the forward left side of FIG. 1;

FIG. 7 is an enlarged perspective view of a portion of FIG. 1;

DESCRIPTION OF THE PREFERRED EMBODIMENT

Figure 1:
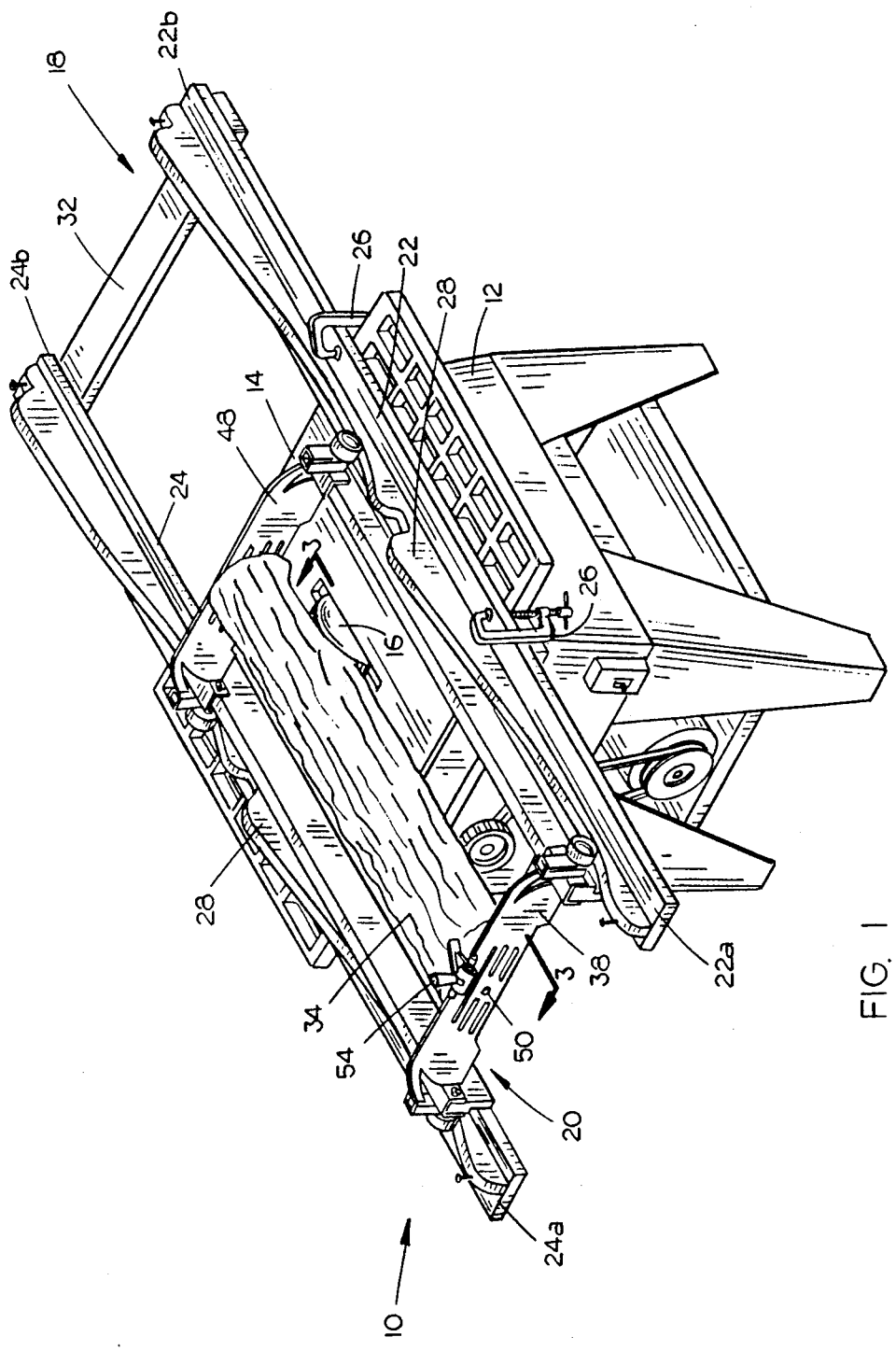
FIG. 1 is a perspective view of a table saw with the woodworking apparatus of the present invention installed thereon.

Referring now to the drawings, in which similar or corresponding parts are identified with the same reference numeral, and more particularly to FIG. 1, the woodworking apparatus of the present invention is identified generally at 10 and is operably mounted on a conventional table saw 12, having a table 14 and a dado circular saw blade 16.

The woodworking apparatus of the present invention includes two main parts, namely, a woodworking pattern apparatus 18 and an operable stock moving apparatus 20.

The pattern apparatus includes a pair of elongated boards 22 and 24 which are oriented parallel to one another on top of table 14. Elongated boards 22 and 24 have forward ends 22a and 24a projecting forwardly of table 14, and the rearward end 22b and 24b extending rearwardly of table 14. Elongated boards 22 and 24 are clamped in position utilizing clamps 26 as shown in FIG. 1.

Figure 10:
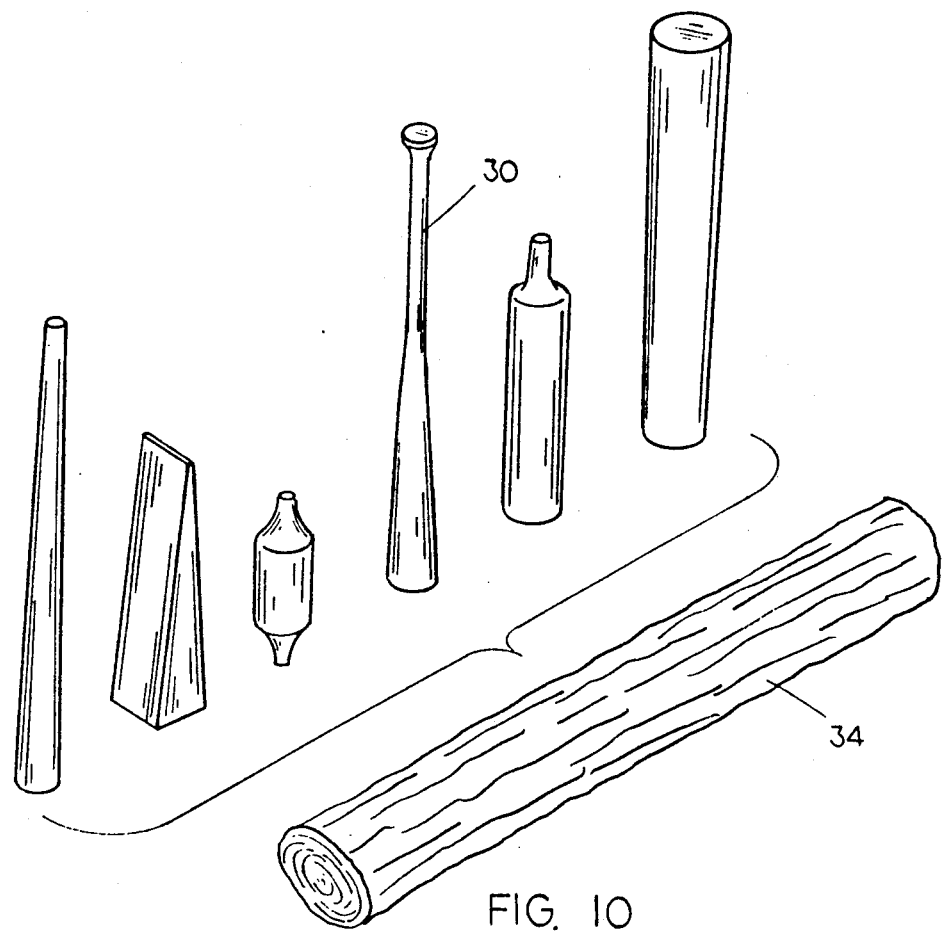
FIG. 10 is a perspective view of a series of shapes which can be manufactured utilizing the woodworking apparatus of the present invention.
Figure 11:
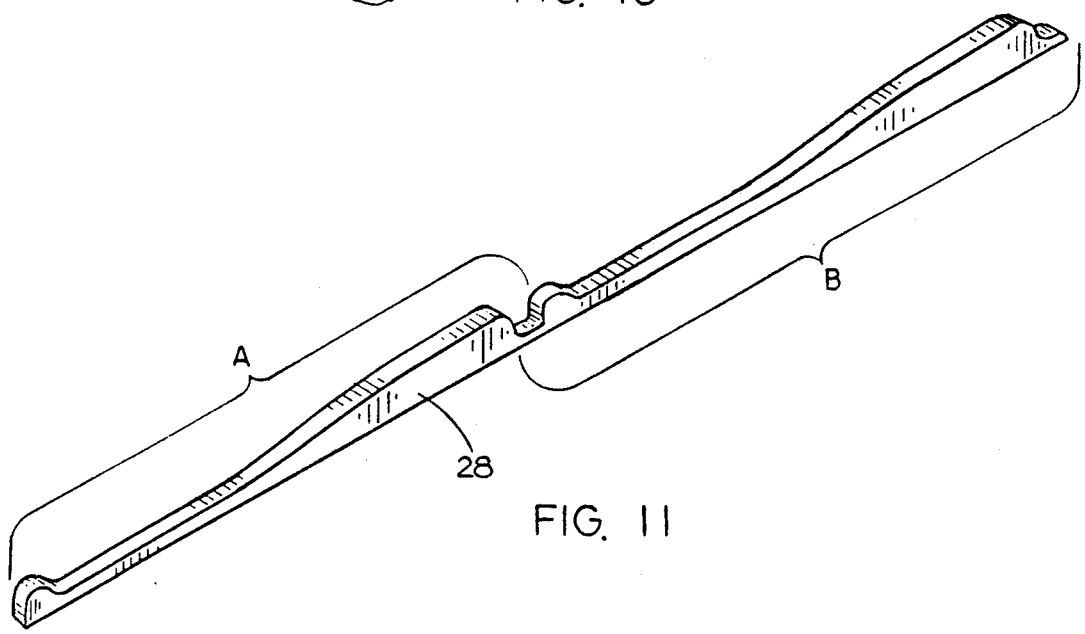
FIG. 11 is a perspective view of one pattern rail of the present invention.

A profile board 28 is mounted to the upper surface of elongated boards 22 and 24, as shown in FIG. 1. Each profile board is identical, and is shown in more detail in FIG. 11. The forward half of the length of profile board 28 is designated generally at A and is identical to the rearward half B, for purpose to be described in more detail hereinbelow. Depending upon the particular profile board utilized, any of the shapes shown in FIG. 10 may be produced utilizing the present invention. The profile board 28 of FIG. 11 will produce a bat, designated generally at 30 in FIG. 10.

Figure 4:
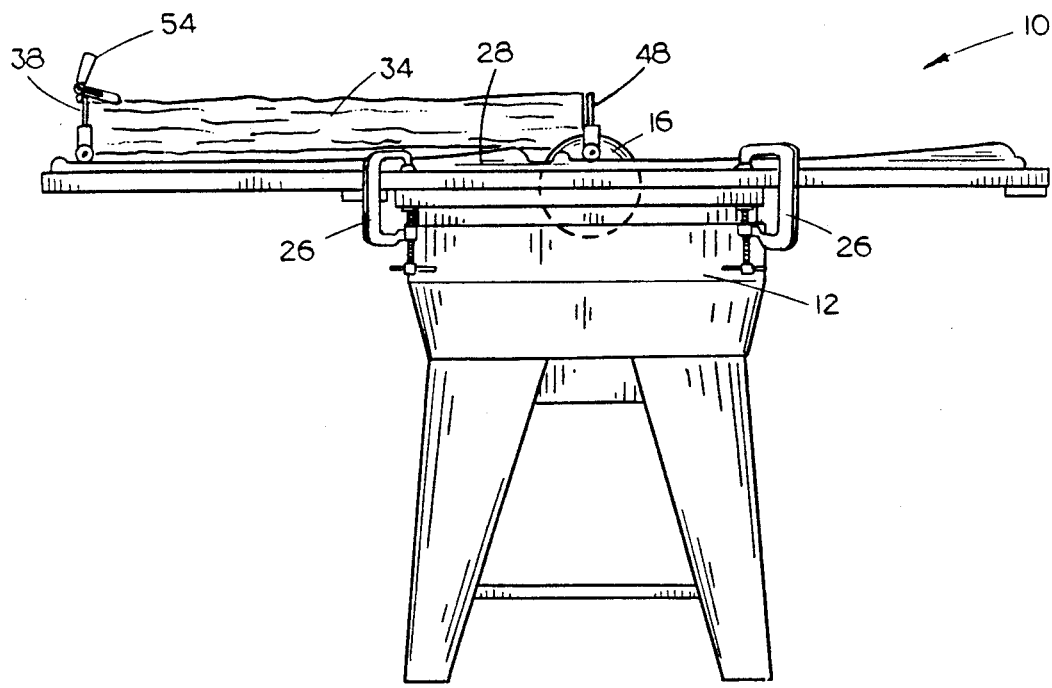
FIG. 4 is a side elevational view taken from the right side of FIG. 1 with a piece of wood stock located on the woodworking apparatus prior to cutting.

A cross member 32 is connected between the rearward ends 22b and 24b of elongated boards 22 and 24, as shown in FIG. 4. Cross member 32 assists in maintaining the parallel spaced relation of boards 22 and 24. A similar cross member may be mounted to the forward ends of boards 22 and 24, although not shown in FIG. 1.

Figure 2:
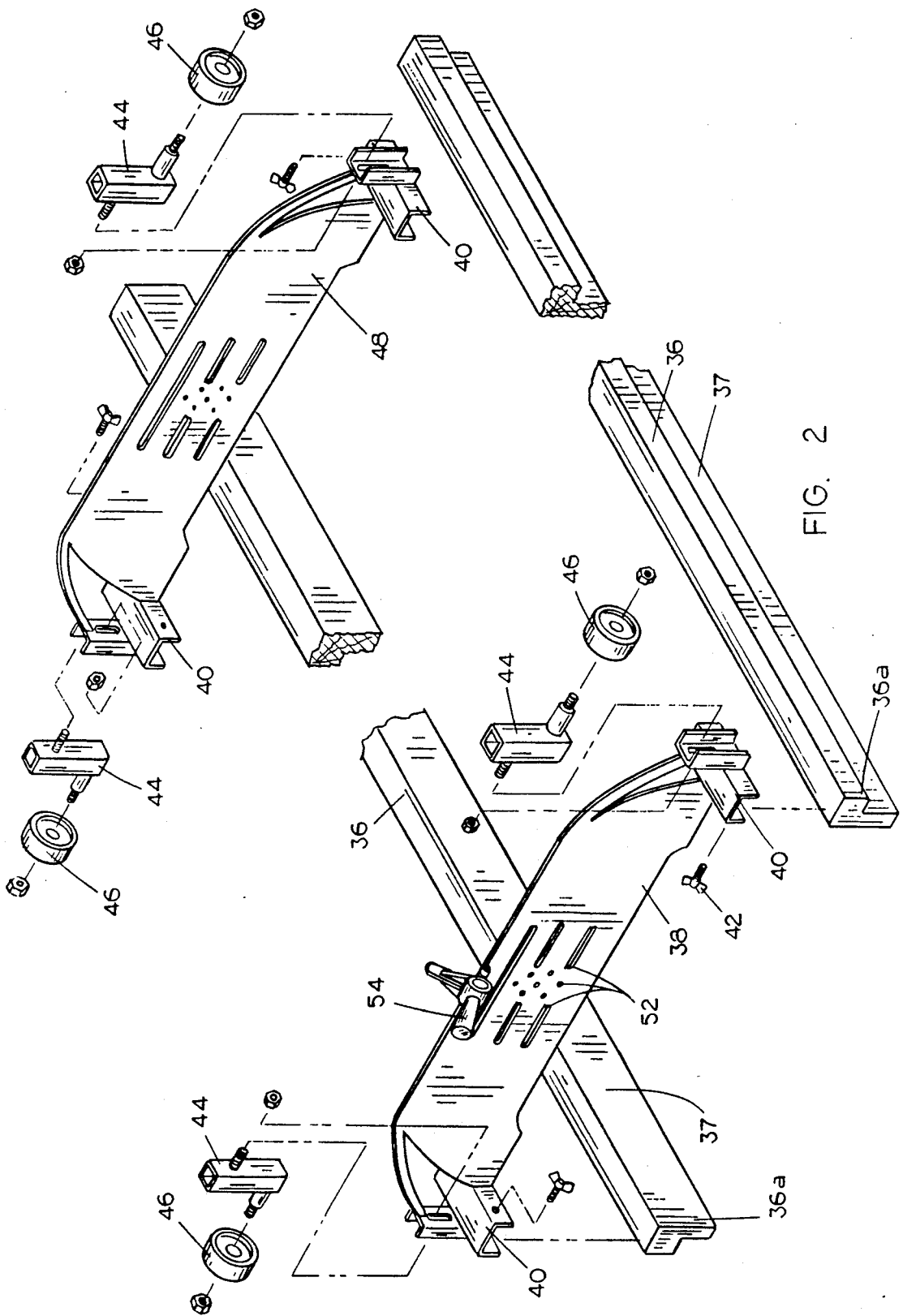
FIG. 2 is an exploded perspective view of the woodworking apparatus of this invention.
Figure 3:
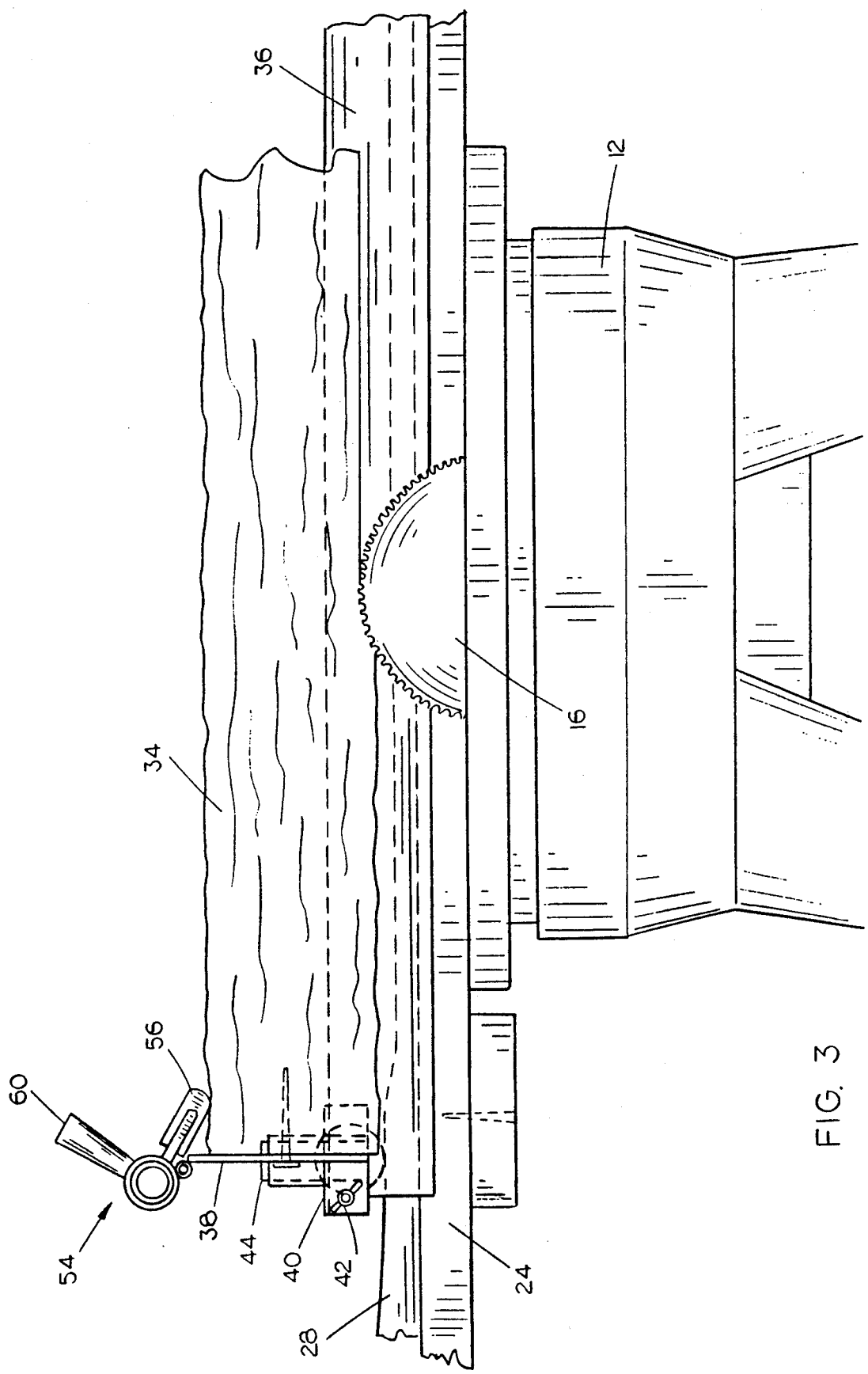
FIG. 3 is a sectional view taken at lines 3—3 in FIG. 1.

As shown in FIG. 1, stock moving apparatus 20 will move along profile boards 28 so as to engage a piece of stock material 34 with dado blade 16. Stock moving apparatus 20 is shown in more detail in FIG. 2, and includes a pair of elongated support members 36, which are spaced apart and parallel. Support members 36 have a depending leg 37 which will slidably contact an edge of elongated boards 24 (see FIG. 7) so as to maintain transverse alignment of the stock material 34 with blade 16. A forward mounting plate 38 extends between the forward ends 36a of support members 36 and is adjustably connected thereto with brackets 40. Each bracket 40 includes a wing nut 42 which is threaded through brackets 40 so as to selectively engage support members 36. In this fashion, forward plate 38 may be adjusted along the length of support members 36.

Each bracket 40 also includes a vertically adjustably mounted leg 44 which has a roller bearing 48 rotatably mounted thereto. Thus, roller bearings 46 may be vertically adjusted with respect to forward plate 38 by adjusting legs 44 on brackets 40.

A rearward plate 48 is adjustably mounted to the rearward ends 36b of support members 36 by identical brackets 40 having legs 44 and roller bearings 46 adjustably mounted thereon. Thus, rearward plate 48 may be adjusted longitudinally along support members 36, and roller bearings 46 may be adjusted vertically with respect to rearward plate 48.

Figure 8:
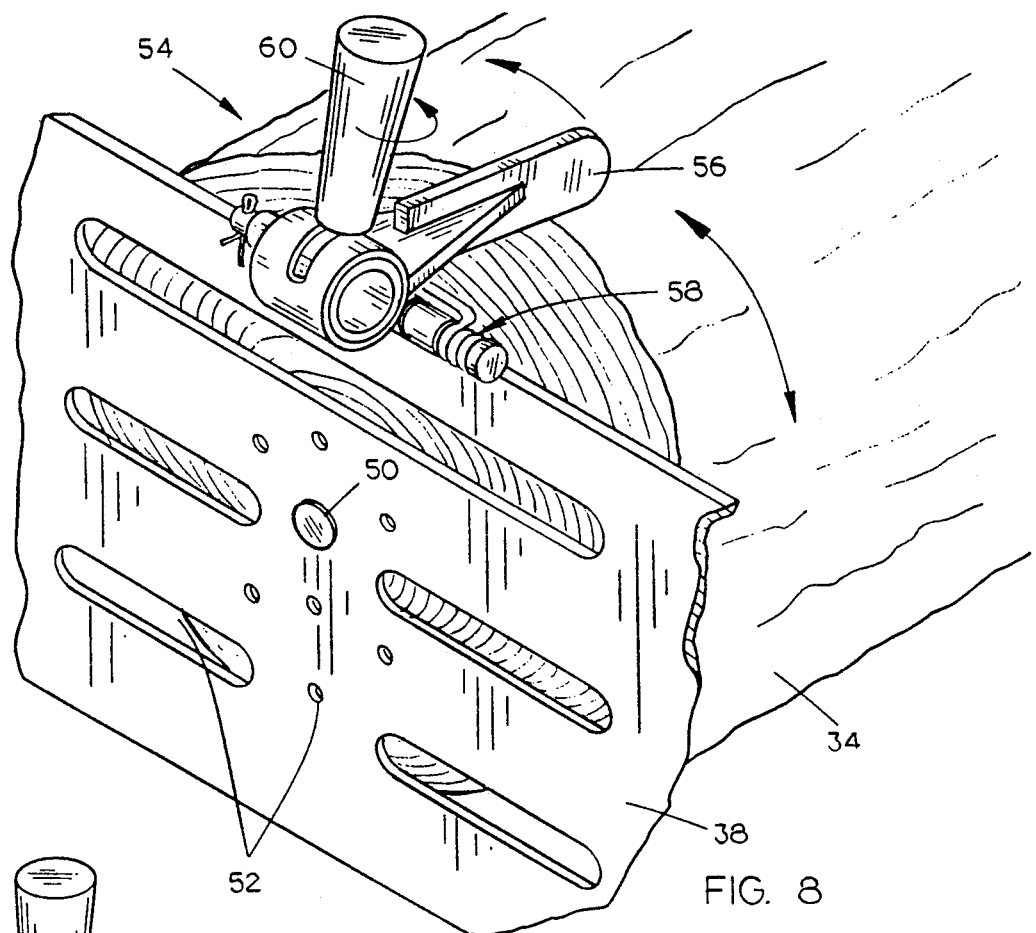
FIG. 8 is a enlarged perspective view of another portion of FIG. 1.
Figure 9:
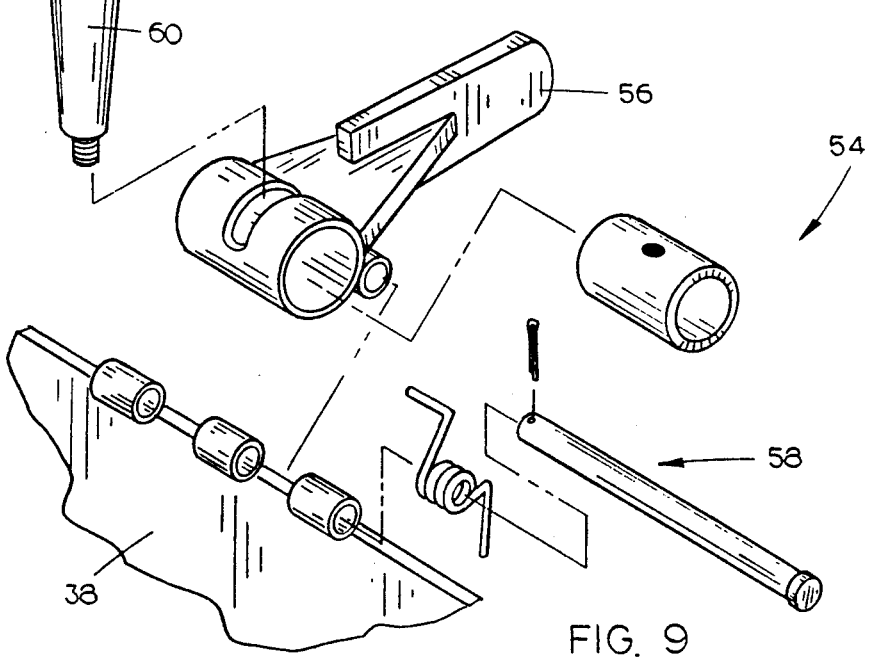
FIG. 9 is an exploded perspective view of the locking mechanism of FIG. 8.

Referring now to FIGS. 1, 6 and 8, stock material 34 is mounted between forward and rearward plates 38 and 48 by inserting a nail or other fastener 50 through an aperture in each of the forward and rearward plates 38 and 48 into the opposite ends of stock material 34. A plurality of apertures and slots 52 are formed in forward and rearward plates 38 and 48 to permit the stock material 34 to be positioned in a variety of locations. For example, a tapered cut may be formed by attaching one end of the stock material to an upper aperture in forward plate 38, and a lower aperture in rearward plate 48. As shown in FIGS. 8 and 9, a locking mechanism 54 is utilized to maintain stock material 34 in a non-rotational orientation between forward and rearward plates 38 and 48. Locking mechanism 54 includes a projecting arm 56 pivotally mounted to the upper edge of forward plate 38 to selectively engage stock material 34. Arm 56 is mounted to plate 38 with a spring biased hinge 58 oriented to maintain arm 56 in locking orientation engaging stock material 34. A handle 60 is mounted to projecting arm 56 to permit the arm to be biased against the force of spring biased hinge 58 to release the locking grip on stock material 34.

In operation, pattern apparatus 18 is fastened to table 14 using clamps 26, as shown in FIG. 1. The desired profile boards 28 are then mounted to elongated boards 22 and 24. A length of stock material is fastened between forward and rearward plates 38 and 48 of stock moving apparatus 20 utilizing nails 50. Stock material 34 should be free to rotate on nails 50 when locking mechanism 54 is unlocked from stock material 34. Stock moving apparatus 20 is then set on top of pattern apparatus 18, with roller bearings 46 engaging profile boards 28, as shown in FIGS. 1 and 7. Saw blade 16 is then lowered or raised to the appropriate height.

Figure 5:
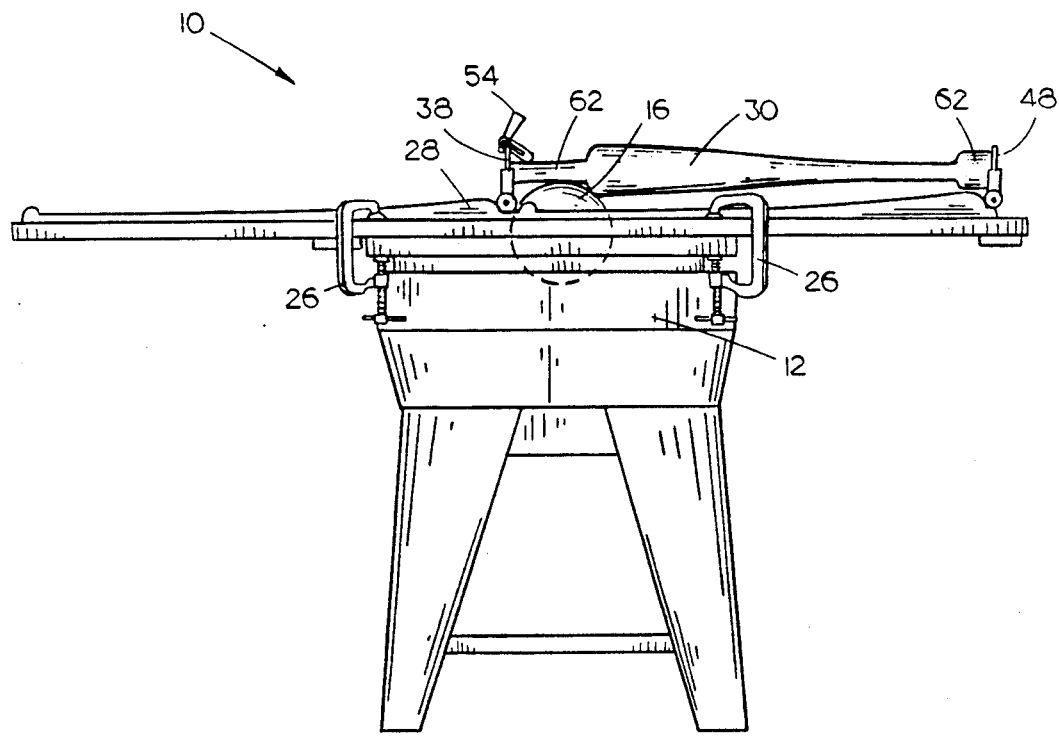
FIG. 5 is a side elevational view similar to FIG. 4, with the piece of stock shown after the cutting operation has occurred.

Table saw 12 is then turned on and locking mechanism 54 is moved to engage stock material 34. Stock moving apparatus 20 is then pushed along profile boards 28 while blade 16 cuts the desired profile into stock material 34, as shown in FIGS. 4 and 5. Once stock moving apparatus 20 has been moved to the rearward end of profile boards 28, the apparatus 20 is returned to the forward position for another pass. Locking mechanism 54 is then disengaged from stock material 34 and the stock material is rotated so as to align an uncut portion of the stock material. Lock mechanism 54 is then reengaged and the process of cutting the stock material is continued. This procedure continues until the stock material 34 has been completely rotated 36° to produce a cylindrical object, as shown in FIG. 5. The excess portions 62 are then removed so as to produce the finished product.

Woodworking apparatus 10 of the present invention may also be utilized to form rectangular or wedge shaped forms. To produce a rectangular form, pattern boards 28 are removed from the table saw 12 (see FIG. 1). In this way, stock moving apparatus 20 will move through a horizontal plane. After each pass is made over saw blade 16, the entire stock moving apparatus 20 is shifted laterally to produce additional cuts parallel to the initial cut. This procedure will leave a generally flat surface on one side of stock material 34. The stock material 34 is then rotated 90°, and further cuts are made. Four flat surfaces may then be formed in the stock material to produce a rectangular shape.

A wedge shape is formed in a fashion similar to that for the rectangular shape, by utilizing wedge shaped pattern boards 28 and shifting the stock moving apparatus laterally after each cut. In this fashion, a wide variety of shapes may be produced utilizing woodworking apparatus 10.

Whereas the invention has been shown and described in connection with the preferred embodiment thereof, it will be understood that many modifications, substitutions and additions may be made which are within the intended broad scope of the appended claims. There has therefore been shown and described an improved woodworking apparatus which accomplishes at least all of the above stated objects.

I claim:

1. A woodworking apparatus for use with a conventional table saw having a table and projecting circular saw blade, comprising:
    a stock moving apparatus to move a piece of stock material into engagement with said saw blade; said stock moving apparatus including:
        a pair of longitudinal, parallel, elongated support members having forward and rearward ends;
        a forward plate connected between the forward ends of said support members;
        a rearward plate connected between the rearward ends of said support members; and
        means for selectively rotatably connecting a piece of stock material between said forward and rearward plates;
    guide means connected to said saw table for guiding said stock moving apparatus in a straight line across said saw table; and
    a pattern apparatus selectively connected to said saw table for selectively raising and lowering said stock moving apparatus in a predetermined pattern as the stock moving apparatus is moved across said saw table.

2. The woodworking apparatus of claim 1, wherein said pattern apparatus includes a pair of profile boards having a predetermined profile formed along an upper longitudinal edge thereof, said profile boards being selectively mounted on said table saw in spaced apart parallel relation, and said stock moving apparatus having means thereon for following the upper longitudinal edges of said profile boards.

3. The woodworking apparatus of claim 1, wherein said forward and rearward plates are selectively adjustably connected to said elongated support members for selective adjustment towards and away from each other.

4. The woodworking apparatus of claim 1, further comprising operable locking means on said forward plate, operable between a "locked" position engaged with said stock material to prevent rotation, and "unlocked" position out of engagement with the stock material.

* * * * *